United States Patent
Nellikar et al.

(10) Patent No.: US 10,659,358 B2
(45) Date of Patent: May 19, 2020

(54) METHOD AND APPARATUS FOR ADVANCED STATISTICS COLLECTION

(71) Applicant: Cisco Technology, Inc., San Jose, CA (US)

(72) Inventors: Suraj Nellikar, San Jose, CA (US); Maithili Narasimha, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 27 days.

(21) Appl. No.: 15/695,713

(22) Filed: Sep. 5, 2017

(65) Prior Publication Data

US 2018/0013675 A1 Jan. 11, 2018

Related U.S. Application Data

(63) Continuation of application No. 14/855,263, filed on Sep. 15, 2015, now Pat. No. 9,781,037.

(51) Int. Cl.
*H04L 12/741* (2013.01)
*H04L 12/931* (2013.01)
(Continued)

(52) U.S. Cl.
CPC ........ *H04L 45/745* (2013.01); *G06F 9/45558* (2013.01); *H04L 41/12* (2013.01); *H04L 43/08* (2013.01); *H04L 43/12* (2013.01); *H04L 45/66* (2013.01); *H04L 49/70* (2013.01); *G06F 2009/4557* (2013.01);
(Continued)

(58) Field of Classification Search
None
See application file for complete search history.

(56) References Cited

U.S. PATENT DOCUMENTS 8,942,237 B2 1/2015 Benny
9,154,327 B1 10/2015 Marino
(Continued)

OTHER PUBLICATIONS

Cisco Technology, Inc., "Enhanced VXLAN on Cisco Nexus 100V Switch for VMware VSphere," Deployment Guide, Jul. 2013.
(Continued)

*Primary Examiner* — Rebecca E Song
(74) *Attorney, Agent, or Firm* — Polsinelli PC

(57) ABSTRACT

Systems, methods, and computer-readable media provide for collection of statistics relating to network traffic between virtual machines (VMs) in a network. In an example embodiment, a virtual switch hosted on a physical server provides network address information of VMs deployed on the physical server to a virtual switch controller. The controller collects this network address information from each virtual switch under its control, and distributes the aggregate address information to each switch. In this manner, the controller and each switch within the controller's domain can learn the network address information of each VM deployed on physical servers hosting switches under the controller's control. Each virtual switch can determine a classification of a frame passing through the switch (e.g., intra-server, inter-server and intra-domain, or inter-domain traffic), and statistics relating to the traffic. In an example embodiment, the virtual switch controller can collect the statistics from each switch within its domain.

20 Claims, 7 Drawing Sheets

(51) Int. Cl.
*H04L 12/721* (2013.01)
*H04L 12/26* (2006.01)
*H04L 12/24* (2006.01)
*G06F 9/455* (2018.01)
*H04L 29/12* (2006.01)

(52) U.S. Cl.
CPC .............. *G06F 2009/45595* (2013.01); *H04L 61/2007* (2013.01); *H04L 61/2038* (2013.01); *H04L 61/2076* (2013.01); *H04L 61/6022* (2013.01)

(56) References Cited

U.S. PATENT DOCUMENTS

| | | | |
|---|---|---|---|
| 9,253,117 B1 | 2/2016 | Poutievski | |
| 2004/0267866 A1 | 12/2004 | Carollo | |
| 2013/0022352 A1* | 1/2013 | Yamashita | H04J 14/0212 398/34 |
| 2013/0268686 A1 | 10/2013 | Wang | |
| 2013/0322446 A1 | 12/2013 | Biswas | |
| 2013/0346592 A1 | 12/2013 | Kamble et al. | |
| 2014/0250220 A1* | 9/2014 | Kapadia | H04L 12/4625 709/224 |
| 2014/0259012 A1* | 9/2014 | Nandlall | H04W 8/02 718/1 |
| 2014/0269709 A1* | 9/2014 | Benny | H04L 45/64 370/392 |
| 2014/0376556 A1 | 12/2014 | Haggar | |
| 2015/0043581 A1 | 2/2015 | Devireddy | |
| 2015/0074276 A1 | 3/2015 | DeCusatis | |
| 2015/0138993 A1 | 5/2015 | Forster | |
| 2015/0163192 A1 | 6/2015 | Jaun | |
| 2015/0281067 A1 | 10/2015 | Wu | |
| 2016/0021032 A1 | 1/2016 | Maier | |
| 2016/0188527 A1* | 6/2016 | Cherian | H04L 709/212 |
| 2016/0191545 A1* | 6/2016 | Nanda | H04L 43/062 726/1 |
| 2016/0330143 A1 | 11/2016 | Song | |
| 2016/0350151 A1 | 12/2016 | Zou | |

OTHER PUBLICATIONS

Cisco Technology, Inc., "Cisco Border Gateway Protocol Control Plane for Virtual Extensible LAN," Cisco White Paper, 2015.
Cisco Technology, Inc., "VXLAN Network with MP-BGP EVPN Control Plane," Design Guide, 2015.

* cited by examiner

METHOD AND APPARATUS FOR ADVANCED STATISTICS COLLECTION

RELATED APPLICATIONS

This application is a continuation of U.S. patent application Ser. No. 14/855,263 filed on Sep. 15, 2015, the contents of which is incorporated by reference in its entirety.

TECHNICAL FIELD

The present technology relates in general to the field of computer networks, and more specifically to collecting statistics for virtual machine-to-virtual machine (VM-to-VM) network traffic.

BACKGROUND

Virtualization is the abstraction of information technology (IT) resources, such as computing or processing via servers, data storage, or networking, to mask the physical nature and boundaries of these resources from consumers of the resources. Virtualization can improve the efficiency and utilization of IT resources. For example, server virtualization enables multiple operating systems and applications to concurrently run on a single physical server, thereby centralizing administrative tasks while improving scalability and hardware utilization. Further, server virtualization enables live migration (e.g., moving a VM between servers or hosts such that the operations of the VM can continue without interruption). Storage virtualization can offer similar benefits, including live migration (e.g., transfer of data between physical storage resources while maintaining concurrent input/output (IO) access), improved utilization, and fewer points of management.

An approach for network virtualization is using encapsulation techniques, such as Virtual Extensible Local Area Network (VXLAN), Network Virtualization using Generic Routing Encapsulation (NVGRE), Network Virtualization Overlays (NVO3), or Stateless Transport Tunneling (STT), to create virtual overlays on existing physical network infrastructure. Network virtualization can also include utilizing server virtualization to virtualize network devices such as switches, routers, firewalls, and load-balancers, among other networking appliances. Using such techniques, network virtualization enables a virtualized data center or network to be implemented via physical servers with packets moving in virtual tunnels on physical networking gear that segregate the packets from other traffic on that gear. Although virtualization of a data center or network can bring many benefits, virtualization may also present new challenges, such as those relating to network performance, quality of service (QoS), and network troubleshooting.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
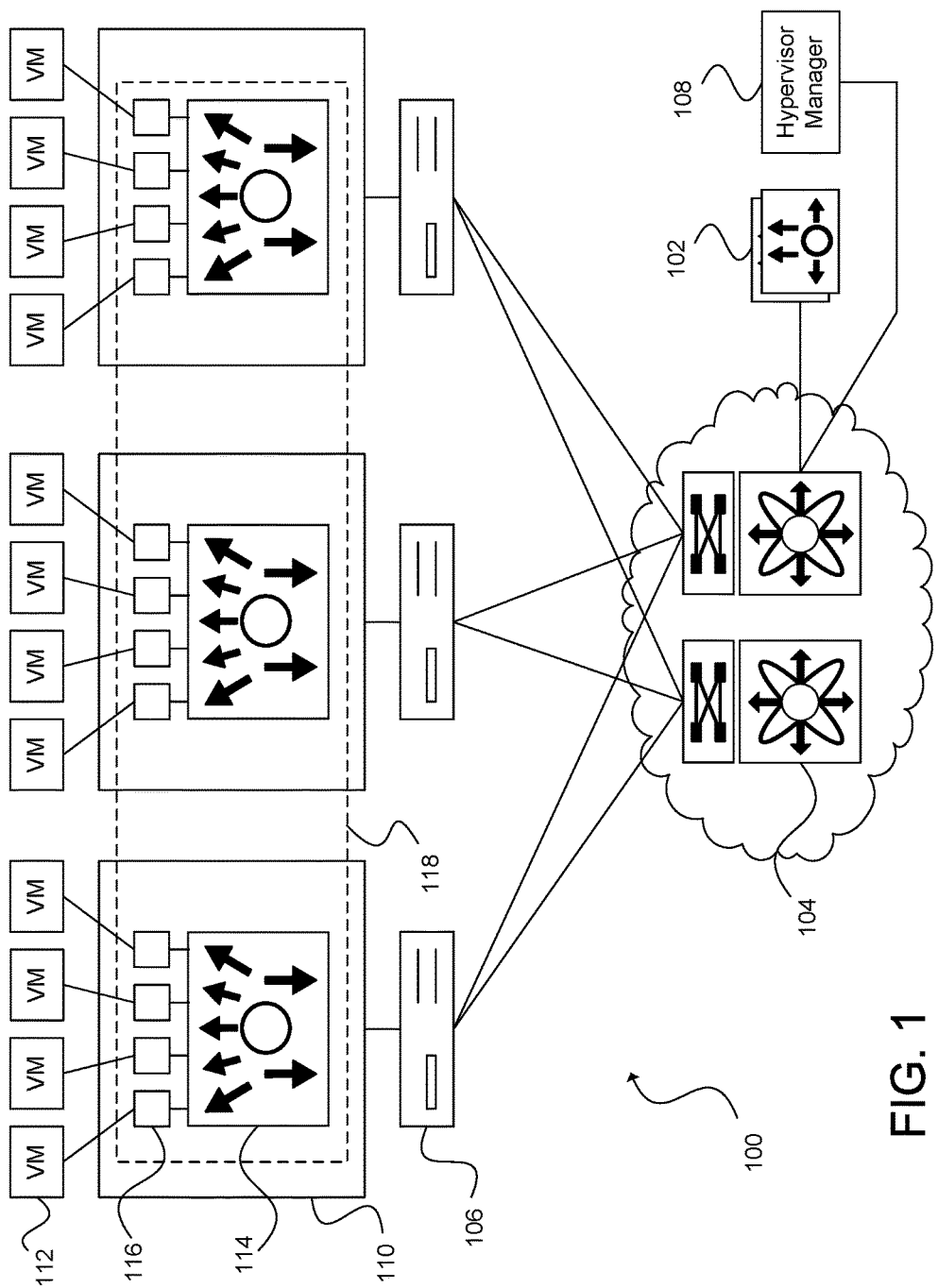
FIG. 1 illustrates an example network environment that can be utilized in an example embodiment.

The detailed description set forth below is intended as a description of various configurations of example embodiments and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Understanding communications between virtual machines (VM) in a network can facilitate critical administrative tasks, such as VM placement in a data center or troubleshooting of the network. In an example embodiment, a virtual switch hosted on a physical server provides unique network address information, such as an Internet Protocol (IP) address, of each VM deployed on the same physical server to a virtual switch controller. The controller collects this network address information from each virtual switch under its control, and distributes the aggregate network address information to each virtual switch. In this manner, the controller and each virtual switch within the controller's domain can learn the unique network address information of each VM provisioned on servers hosting virtual switches under the controller's control. Each virtual switch can inspect a frame or packet upon ingress, egress, or both to analyze whether the frame or packet corresponds to intra-server, inter-server and intra-domain, and inter-domain VM-to-VM network traffic, and determine or update statistics relating to the traffic. The virtual switch controller can collect the statistics from each virtual switch within the controller's domain. In an example embodiment, the aggregate statistics can be used for determining whether and where to migrate a VM. In another example embodiment, the aggregate statistics can be mined for presentation via a dashboard that represents VM-to-VM traffic patterns in a data center.

DETAILED DESCRIPTION

Server virtualization is increasingly utilized by server administrators to try to address growing demands for server resources and combating server sprawl. While server virtualization can deliver many benefits to a data center, as discussed above, it may also introduce a number of complications. These complications can include lack of transparency of network traffic between virtualized systems, increased difficulties with network troubleshooting, and reduction of operational efficiency of the network.

A potential difficulty with virtualization, from a networking perspective, can be the lack of visibility into the VM environment. For example, in a traditional physical environment in which each network port is associated with one physical server, the process of mapping necessary policies for features (e.g., access, security, regulation compliance, QoS, etc.) may be relatively straightforward. In a virtualized environment, dozens of virtual servers can be connected to a physical port through a software switch that resides on a physical server. Such an arrangement can require reassessment of business practices to maximize the advantages provided by virtualization, but there may be little to no information to make intelligent decisions.

This same challenge with visibility into a virtualized network can extend to troubleshooting. For instance, in a physical environment, if users of an application are experiencing problems with responsiveness, the traffic on the port (to which the server running the application is connected) can be relatively easy to analyze to determine whether a network component is causing the problem. In a virtualized environment, the traffic from all VMs may be blended together such that isolating traffic from a particular VM at the physical port can be much more difficult. In addition, a network administrator may not be able to use the same tools and processes that would normally be used to troubleshoot and manage the rest of the network. One additional concern relating to transparency arises from a software switch. Traffic can be switched between VMs on the same server without any capability to control or audit this interaction, a situation that introduces a number of concerns related to security, policy, and/or regulatory compliance.

Another potential problem relates to how to incorporate one of the foremost benefits of virtualization, live migration (e.g., the capability to move a running VM from one physical server to another without disruption). This feature has various advantages, such as resource balancing, increased system availability, and simpler server maintenance activities. For example, a hypervisor manager can migrate a VM to optimize resource use, facilitate maintenance activities, or proactively move VMs away from failing or underperforming physical servers. However, these added values may not be realized due to the lack of insight into network traffic between VMs.

Systems and approaches in accordance with various embodiments of the present disclosure may overcome the foregoing or other limitations with conventional techniques by collecting statistics for VM-to-VM network traffic in real-time or substantially real-time while minimizing processing, storage, and networking resources. These statistics can be used for decisions relating to placement and migration of VMs to improve distribution of network bandwidth utilization and/or decrease network latency. These metrics can also be visualized, such as via a real-time dashboard of traffic patterns in a data center, to assist a network administrator in tasks such as planning and expansion of the data center or troubleshooting network connectivity issues, policy violations, and network misconfiguration.

FIG. 1 illustrates a network environment 100 that can be utilized to collect statistics for VM-to-VM network traffic in an example embodiment. Network environment 100 can include a virtual switch controller or virtual supervisor module (VSM) 102, network access switches 104, physical servers 106, and a hypervisor manager 108. Each server 106 may deploy a respective virtual machine manager or hypervisor 110, which can be configured for managing multiple virtual partitions. In general, a virtual partition may be an instance of a VM (e.g., VM 112), sandbox, container, or any other isolated environment that can have software operating within it. The software may include an operating system and application software. For software running within a virtual partition, the virtual partition may appear to be a distinct physical machine. In certain embodiments, hypervisor 110 may be a native or "bare metal" hypervisor that runs directly on hardware, but that may alternatively run under host software executing on hardware. A virtual switch or Virtual Ethernet Module (VEM) 114 may operate within each hypervisor 110 and provide a dedicated set of virtual switch ports 116 for each VM 112 for connectivity in network 100. In this example embodiment, each VEM 114 forms a distributed virtual switch 118 that can be controlled by VSM 102. In an example embodiment, VSM 102 and each VEM 114 may be implemented as Nexus® 1000V Series Switches from Cisco®, Systems, Inc. of San Jose, Calif.

VSM 102 can be implemented in an active-standby model to ensure high availability, with a first VSM functioning in a primary role and a second VSM functioning in a secondary role. If the first VSM fails, the second VSM can take over control. A virtual chassis model can be used to represent VSM 102 and each VEM 114. The high availability pair of VSMs 102 can be associated with slot numbers 1 and 2 in the virtual chassis, and each VEM 114 can be sequentially assigned to the remaining slots based on the order in which the VEM's host 106 is added to the distributed virtual switch 118. VSM 102 can be deployed as either a virtual appliance, such as on a VM 112, or as a hardware appliance, which is discussed elsewhere herein. In the virtual chassis model, VSM 102 may be configured to provide control plane functionality for each virtual switch 114. Each VEM 114 can provide network connectivity and switching capability for VMs hosted on a corresponding server 106 like a line card in a modular switching platform, and can operate as part of a data plane associated with the control plane of VSM 102. Unlike multiple line cards in a single chassis, each VEM can act as an independent switch from a forwarding perspective.

VSM 102 can utilize various Virtual Network Interface Cards (VNICs) (not shown) for providing the VSM with specific functionality, such as management, control, or packet transmission. The control interface can be used by VSM 102 to communicate with each VEM 114, such as for extended management communication, carrying low-level messages to ensure proper configuration of the VEM, or maintaining heartbeats with the VSM to the VEM. The control interface can also be used for VSM high availability communication between a primary VSM and a secondary VSM. The management interface can be used to maintain a connection between VSM 102 and hypervisor manager 108. The packet interface can be used for carrying network packets from the VEM to the VSM, such as Cisco Discovery Protocol (CDP), Link Aggregation Control Protocol (LACP), or Interior Gateway Management Protocol (IGMP) packets. In an example embodiment, each VEM 114 can use the packet interface to communicate VM-to-VM traffic statistics to VSM 102, as discussed elsewhere herein.

Figure 2:
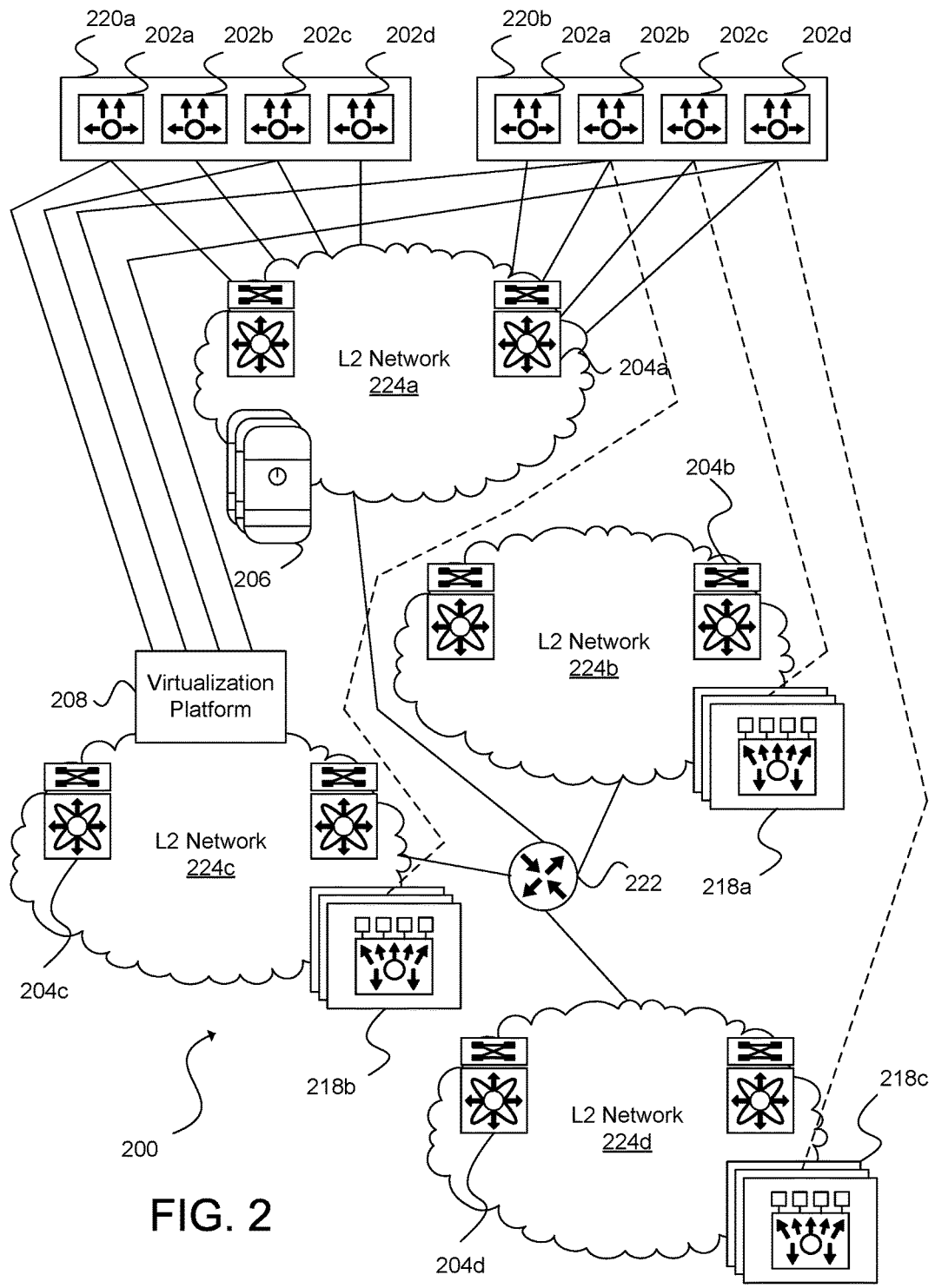
FIG. 2 illustrates an example network environment that can be utilized in an example embodiment.

FIG. 2 illustrates a network environment 200 that can be utilized to aggregate VM-to-VM network traffic statistics in an example embodiment. Network environment 200 can include network appliances 220a and 220b and a core switch 222 for interconnecting L2 networks 224, 226a, 226b, and 226c. In FIG. 2, a solid line represents a physical connection, and a dashed line represents a logical connection. Although this example embodiment only includes L2 networks, it will be appreciated that other example embodiments can include L2 and L3 networks or L3 networks alone. In this example embodiment, the L2 networks are shown to be interconnected via core switch 222 but other example embodiments can utilize different switch configurations, such as a spine fabric of a spine-leaf architecture or other appropriate network topology as would be known by one of ordinary skill in the art. In addition, in other example embodiments, a VSM can be used to control VEMs located in separate networks because a VSM is not limited to controlling VEMs within a single network.

The modules hosted, created, and managed by each network appliance 220a or 220b are called virtual service blades (VSBs), and can each include a VSM (e.g., VSMs 202a, 202b, 202c, or 202d), Layer 4 to 7 traffic management services, a firewall for east-west traffic, or other networking services. Network appliances 220a and 220b can be configured to provide high availability by using redundant VSB pairs. In this example embodiment, network appliances 220a and 220b may both be active at once. However, VSMs 202a and 202c on network appliance 220a may be active while VSMs 202b and 202d are on standby, and VSMs 202b and 202d on network appliance 220b can be active while VSMs 202a and 202c are on standby. If one network appliance fails, the VSMs on standby state on the other network appliance can become active. In another example embodiment, network appliance 220a and each of its VSMs 202a, 202b, 202c, and 202d may be active, and network appliance 220b and each of its VSMs may be on standby. If network appliance 220a fails, network appliance 220b and each of its VSMs 202a, 202b, 202c, and 202d can become active. Other configurations are possible for providing high availability as would be known to one of ordinary skill in the art. In an example embodiment, network appliances 220a and 220b are a pair of Nexus® 1100s network appliances from Cisco®, Systems, Inc.

L2 network 224a can include a pair of network access switches 204a or other appropriate network design and a cluster of physical servers 206. Network appliances 220a and 220b and their respective VSMs 202a, 202b, 202c, and 202d are directly connected to network 224a. Although the example embodiment illustrated in FIG. 2 depicts each L2 network as providing network connectivity for a single type of endpoint (e.g., physical server or VM), it will be appreciated that other example embodiments can provide connectivity for various types of devices and endpoints.

Each L2 network 224b, 224c, and 224d can include a pair of network access switches 204b, 204c, 204d, respectively, or other suitable physical network infrastructure and one or more physical servers (e.g., server 106 of FIG. 1). Each physical server can deploy a respective hypervisor (e.g., hypervisor 110 of FIG. 1), and a respective virtual switch (e.g., VEM 114 of FIG. 1) may operate in each hypervisor to provide a respective set of virtual switch ports (e.g., virtual switch port 116 of FIG. 1) for each VM (e.g., VM 112 of FIG. 1) for network connectively. In this example embodiment, each L2 network 224b, 224c, and 224d includes a respective plurality of VEMs that form distributed virtual switches 218a, 218b, and 218c, respectively. Distributed virtual switch 218a can be controlled by active VSM 202c, distributed virtual switch 218b can be controlled by active VSM 202b, and distributed virtual switch 218c can be controlled by active VSM 202d. VMs (not shown) within each L2 network 224b, 224c, and 224d can be managed by a hypervisor manager of virtualization platform 208 residing in L2 network 224c, such as vSphere® from VMware®, Inc. of Palo Alto, Calif., Hyper-V® from Microsoft® Corp. of Seattle, Wash., or XenServer® from Citrix® Systems, Inc. of Santa Clara, Calif. Each L2 network 224a, 224b, 224c, or 224d can represent a private cloud or a public cloud, a data center of a separate enterprise, a data center of a single enterprise (e.g., a central office or a remote/branch office), or other network configuration as would be known to one of ordinary skill in the art.

A potential scenario for network environment 200 can occur in which a VEM receives control packets from a VSM that is managing a completely different set of VEMs (i.e., the VEM is not in the domain of the VSM). If the VEM were to respond to such packets (for example, a request to reconfigure an interface), the VEM would not forward packets as expected. To prevent this situation, domain identifiers (IDs) can be used to identify a VSM and VEM as related to one another. The domain ID can be defined when the VSM is first installed and may be part of the virtual switch configuration data that is transmitted to a hypervisor manager or other virtualization platform.

Each command sent by the VSM to any associated VEMs can be tagged with this domain ID. When a VSM and VEM share the same domain ID, the VEM can accept and respond to requests and commands from the VSM. If the VEM receives a command or configuration request that is not tagged with the correct domain ID, that request can be ignored. Similarly, if the VSM receives a packet from a VEM that is tagged with the wrong domain ID, the packet can be ignored.

Each of the elements of FIGS. 1 and 2 may couple to one another through simple interfaces (tangible or virtual) or through any other suitable connection (wired or wireless), which provides a viable pathway for network communications. Additionally, any one or more of these elements of FIGS. 1 and 2 may be combined or removed from the architecture based on particular configuration needs. Network environments 100 and 200 may each include a configuration capable of transmission control protocol/Internet protocol (TCP/IP) communications for the transmission or reception of packets in a network. Network environments 100 and 200 may also operate in conjunction with a user datagram protocol/IP (UDP/IP), or any other suitable protocol where appropriate and based on particular needs.

As discussed, network virtualization can allow hardware and software resources to be combined in a virtual network. For example, network virtualization can allow multiple numbers of VMs to be attached to a physical network via respective Virtual LANs (VLANs). The VMs can be grouped according to their respective VLAN, and can communicate with other VMs as well as other devices on the internal or external network.

An approach for network virtualization is to utilize overlay networks to allow virtual networks to be created and layered over a physical network infrastructure. Overlay network protocols, such as VXLAN, NVGRE, NVO3, and STT, provide a traffic encapsulation scheme which allows network traffic to be carried across L2 and L3 networks over a logical tunnel. Such logical tunnels can be originated and terminated through Virtual Tunnel End Points (VTEPs) or physical or virtual switches including VTEP functionality, such as a VEM (e.g., VEM 114 of FIG. 1). Although any of these overlay network protocols or other overlay techniques known to one of ordinary skill can be utilized in various example embodiments, VXLAN encapsulation will be discussed herein for purposes of illustration.

Figure 3:
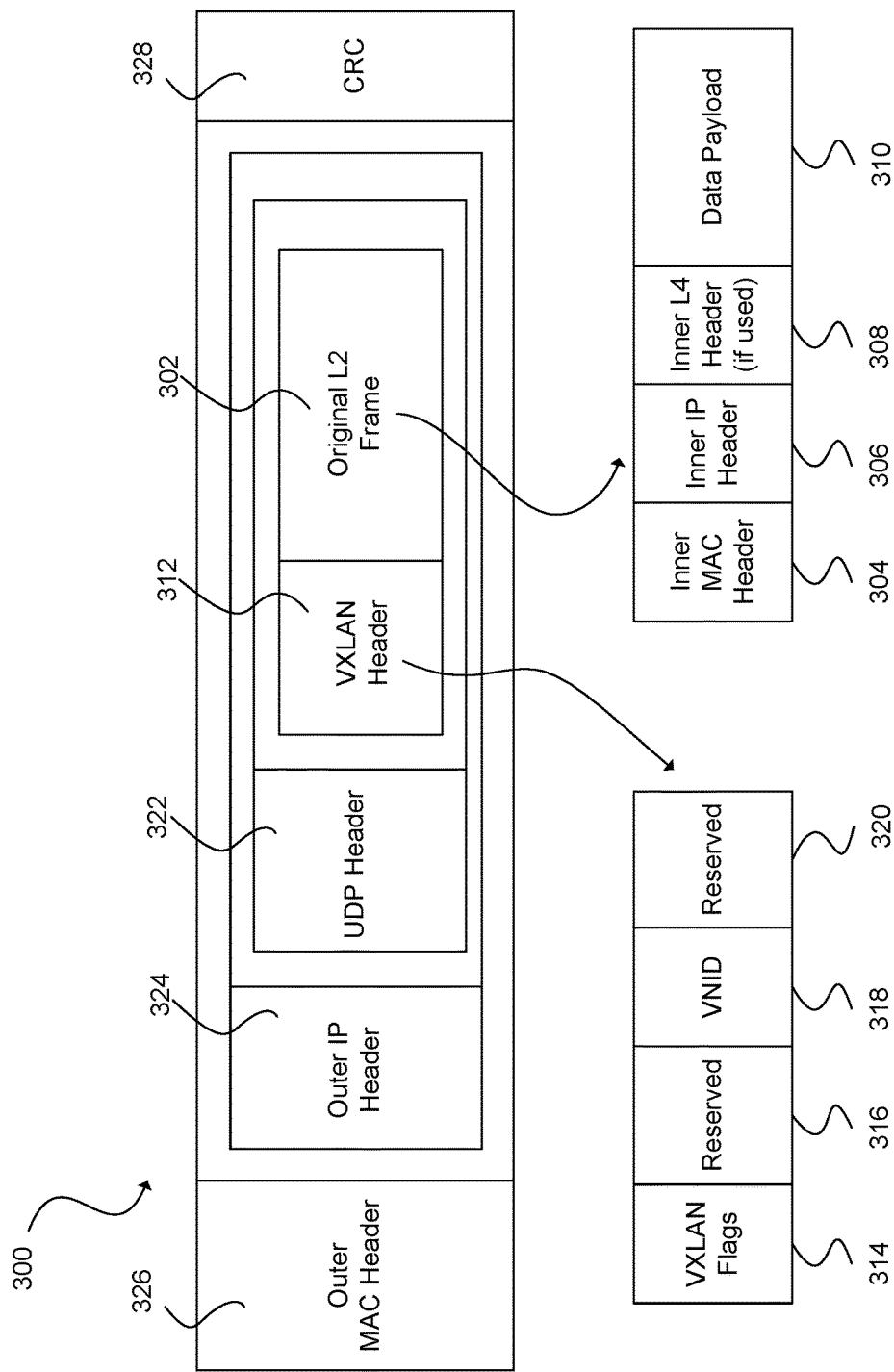
FIG. 3 illustrates an example of an virtual network overlay encapsulated packet that can be utilized in an example embodiment.

VXLAN is a Layer 2 network isolation technology that uses a 24-bit segment identifier or VXLAN Identifier (VNID) to scale beyond the 4096-segment limitation of VLANs. VXLAN technology creates LAN segments by using an overlay approach with Media Access Control in User Datagram Protocol (MAC-in-UDP) encapsulation. FIG. 3 illustrates an example of a VXLAN encapsulated packet 300. Encapsulation can be performed by a VTEP/VEM. A VTEP/VEM may have two logical interfaces, an uplink and a downlink. The downlink can be used to receive Ethernet (L2) frames from an endpoint (e.g., VM or physical server), which can be mapped to a VNID using the VLAN of the Ethernet frame. A lookup can be performed in a forwarding table using the VNID and an L2 destination address within the Ethernet frame to determine the IP address of the destination VTEP/VEM. The Ethernet frame can then be encapsulated and sent out on the uplink. For example, a source VTEP/VEM can encapsulate an original L2 frame 302 transmitted from a VM (e.g., VM 112 of FIG. 1) via the downlink. The original L2 frame can include an inner MAC header 304, an inner IP header 306, an inner L4 header 308, a data payload 310, and an original cyclic redundancy check (CRC) (not shown). The original CRC can be used to detect an error with the original L2 frame 302.

If there is no error with the original L2 frame, the VTEP/VEM can add a VXLAN header 312 to the original L2 frame (with the original CRC dropped). The VXLAN header 312 can be an 8 byte field having 1 byte allocated for VXLAN flags 314, 3 bytes allocated to the VNID 316, and 4 bytes allocated to two separate reserved fields 318 and 320 (3 bytes and 1 byte, respectively). The VXLAN header 312 and original L2 frame 302 can be encapsulated in a UDP-in-IP packet, thus adding UDP header 322 and Outer IP header 324. The VEM can encapsulate the UDP-IP packet in a MAC frame, thereby adding Outer MAC header 326, and calculate a CRC 328 to append to the VXLAN frame. A MAC address of a next hop in the network can be used as an L2 destination address of the outer MAC header 326, and the L2 address assigned to the source VTEP/VEM can be used as the L2 source address of the outer MAC header. An IP address assigned to the destination VTEP/VEM can be used as a destination address of the outer IP header 324, and the IP address assigned to the source VTEP/VEM can be used as a source address of outer IP header 324.

The downlink can also be used to send Ethernet frames, which have been de-encapsulated by a VTEP/VEM, to destination VMs. For example, a de-encapsulated VXLAN frame (i.e., Ethernet frame) can be mapped from the VNID to a VLAN, and sent to a VM assigned a MAC address corresponding to a destination L2 address of an inner L2 header (e.g., inner MAC header 304) of the Ethernet frame, or an IP address corresponding to a destination IP address of an inner IP header (e.g., inner IP header 306). The uplink can be used to receive VXLAN frames from a network fabric, and route VXLAN frames based on a MAC address and IP address assigned to each VTEP/VEM.

A VTEP/VEM can be an originator (or first hop) and/or a terminator (or last hop) for VM-to-VM network traffic as well as VM-to-physical machine traffic. An example approach for distinguishing VM-to-VM and VM-to-physical network traffic is to inspect a packet's original or inner source address and destination addresses to determine whether the original or inner source and/or destination address are assigned to a VM within the network. A first potential drawback to this approach is that the original or inner L2 network address information may not necessarily correspond to the original source and/or destination address as such information can be overwritten during a packet's transit. However, a packet's original or inner IP source and destination addresses are retained throughout transit. A second potential hurdle with this approach can involve identifying whether a particular IP address corresponds to a VM. In various example embodiments, each VEM/VTEP can learn all IP addresses of VMs within a network through distributive learning.

Figure 4:
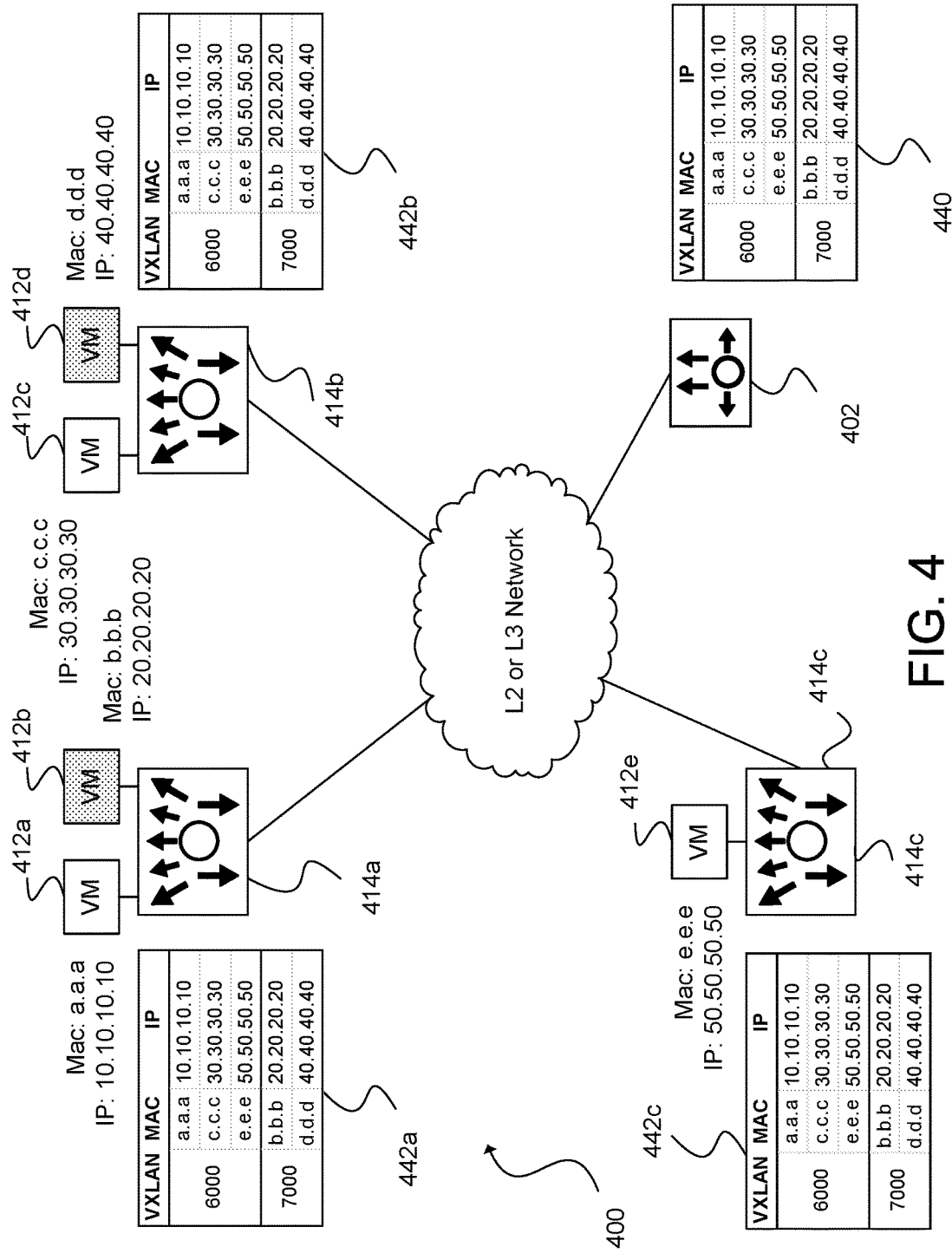
FIG. 4 illustrates an example approach for distributing and learning network address information of VMs within a network that can be utilized in an example embodiment.

FIG. 4 illustrates an example approach for distributing and learning network address information of VMs within a network 400 that can be utilized in an example embodiment. Network environment 400 can include a VSM 402 and VEMs 414a, 414b, and 414c interconnected by an L2 or L3 network 424. VEMs 414a, 414b, and 414c can form a distributed switch that can be under the control of, or within the domain of VSM 402. VEM 414a can reside within a same physical server (not shown) that hosts VM 412a, that may be associated with MAC address aa.aa.aa and IP address 10.10.10.10, and VM 412b, that may be associated with MAC address bb.bb.bb and IP address 20.20.20.20. VEM 414c can be located on same physical server (not shown) that hosts VM 412c, that may be associated with MAC address cc.cc.cc and IP address 30.30.30.30, and VM 412d, that may be associated with MAC address dd.dd.dd and IP address 40.40.40.40. VEM 414c can be located on same physical server that hosts VM 414e, that may be associated with MAC address ee.ee.ee and IP address 50.50.50.50. VMs 412a, 412c, and 412e can be assigned to VXLAN segment 6000, and VMs 412b and 412d can be assigned to VXLAN segment 7000.

In an example embodiment, the highly distributive architecture of VSM 402, VEMs 414a, 414b, and 414c, and VMs 412a, 412b, 412c, 412d, and 412e (which can further include hundreds of additional VEMs and thousands of VMs per VSM in various example embodiments) can be utilized to learn network address information for each VM in network 400. For instance, VSM 402 can continuously learn all MAC addresses (e.g., a.a.a, b.b.b, c.c.c, d.d.d, and e.e.e) and/or IP addresses (e.g., 10.10.10.10, 30.30.30.30, and 50.50.50.50) in VXLAN 6000 and VXLAN 7000 (e.g., 20.20.20.20 and 40.40.40.40), and store this information in a mapping or table 440 of VXLANs to the network address information of VMs within each VXLAN. For example, when VM 412a initially connects to VEM 414a, VEM 414a can publish MAC address a.a.a and/or IP address 10.10.10.10 to VSM 402. Alternatively or in addition, VEMs 414b or 412c can dynamically learn that VM 412a is assigned to MAC address a.a.a and/or IP address 10.10.10.10, such as via pNICs of the host of VM 412a. VSM 402 can distribute MAC address a.a.a and/or IP address 10.10.10.10 of VM 412a to each VEM 414a, 414b, and 414c. VEMs 414a, 414b, and 414c can use this information to program MAC/IP address entries in their respective VXLAN to MAC/IP address tables 442a, 442b, and 442c. In this manner, all VEM MAC/IP address tables 442a, 442b, and 442c can maintain all known MAC and IP addresses in VXLANs 6000 and 7000 at substantially all times, as shown in FIG. 4. Such an approach can be especially advantageous because much of the processing can already occur to implement a VXLAN overlay network, and the additional steps described above may only require negligible additional processing, memory, and/or network resources.

Figure 5:
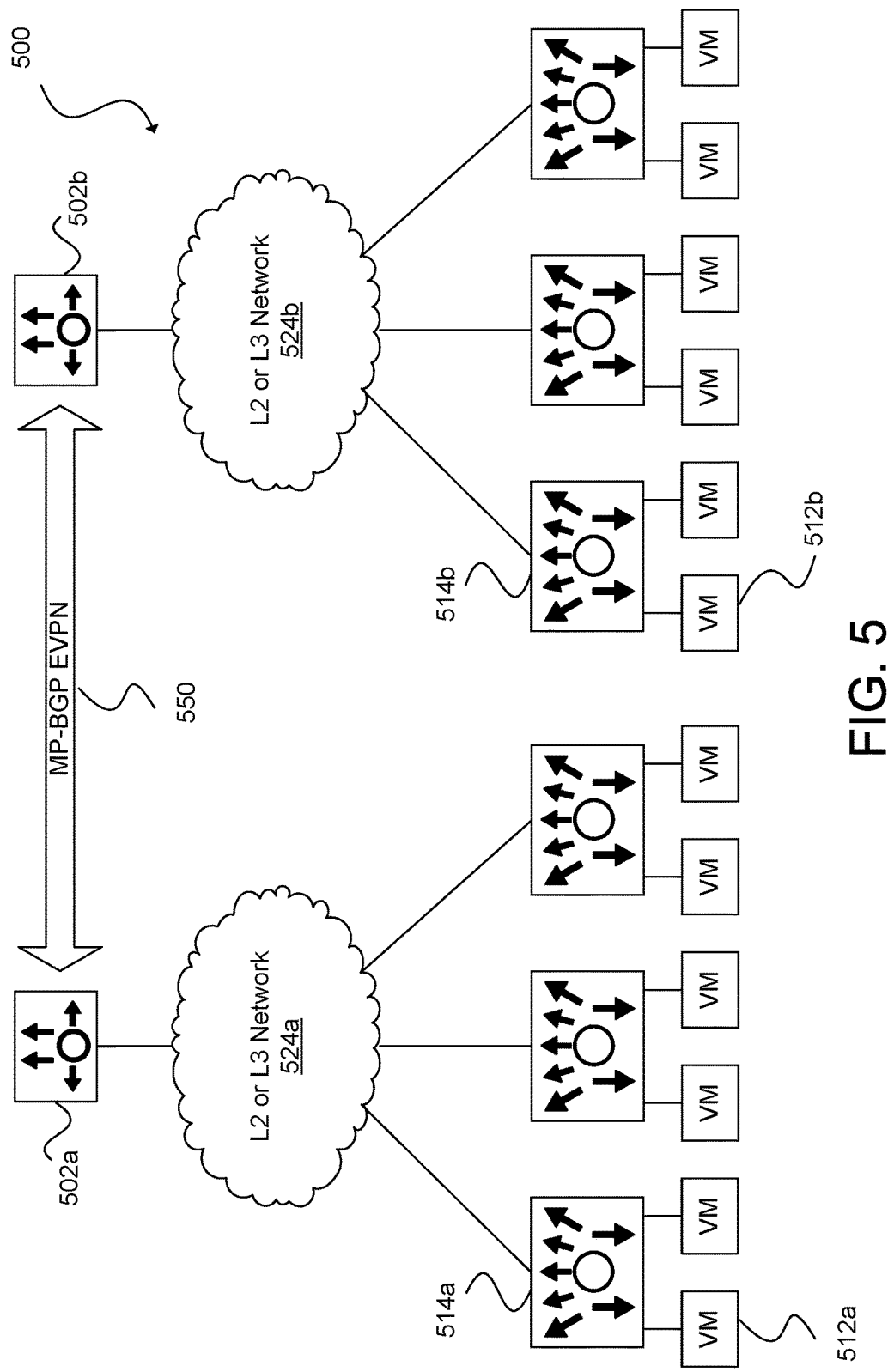
FIG. 5 illustrates an example approach for distributing and learning network address information of VMs within a network that can be utilized in an example embodiment.

FIG. 5 illustrates an example approach for distributing and learning network address information of VMs within a network 500 that can be utilized in an example embodiment.

Network environment 500 can include separate VSMs 502a and 502b and L2 or L3 networks 524a and 524b. L2 or L2 network 524a can be used to interconnect VSM 502a with each VEM 514a, and L2 or L3 network 524b can be used to interconnect each VEM 514b. Each of VEMs 514a and 514b are hosted on a same respective physical server (not shown) as one or more VMs 512a and 512b, respectively. Each VEM 514a can comprise a distributed virtual switch that may be controlled by VSM 502a, and each VEM 514b can form a distributed virtual switch that may be within the domain of VSM 502b. VSM 502a and each VEM 502a can use an approach similar to that discussed with respect to FIG. 4 to learn the network address information of each VM 512a. Likewise, VSM 502b and each VEM 502b can use similar techniques to distribute and learn network address information of each VM 512b. However, VSM 502a and VEMs 514a may not necessarily know the network address information of each VM 512b within the domain of VSM 502b Similarly, VSM 502b and VEMs 514b do not necessarily have the network address information of each VM 512a.

In an example embodiment, VSM 502a and each VEM 514a can learn the network address information of each VM 512b and VSM 502b and each VEM 514b can learn the network address information of each VM 512a by implementing Multiprotocol Border Gateway Protocol Ethernet Virtual Private Network (MP-BGP EVPN) 550 as a control plane for VXLAN. MP-BGP EVPN 550 is a control protocol for VXLAN that can be used to exchange VXLAN information and VM network address information, collected through distributive network address information learning by each VSM and the VEMs within its domain, across VSMs.

For example, each VEM 514a and 514b can perform local learning to obtain MAC and IP address information for each respective set of VMs hosted on a same physical server as the VEM. Each VEM may then distribute this information to its VSM. Each VSM 502a and 502b in network 500 can advertise the VXLAN information and network address information of VMs in its domain via MP-BGP EVPN control plane 550, and receive MP-BGP EVPN 550 updates from its peers. Each VSM can then distribute its peers' VXLAN information and VM MAC and IP address information to each VEM within its domain. Using such an approach, each VSM and VEM can learn the VXLAN information and MAC and IP address information of each VM in a network.

After each VEM has learned the network address information of every VM in a network, packets that pass through the VEM can be inspected or mined for statistics relating to VM-to-VM traffic. As used herein, "intra-server," "intra-host," or "inter-VM" traffic can include network traffic between two VMs provisioned on the same physical server. For instance, traffic between VMs 412a and 412b or VMs 412c and 412d of FIG. 4 may be characterized as inter-server, intra-host, or inter-VM traffic because such traffic originates and terminates on a same physical server. "Inter-server" or "inter-host" and "intra-domain" or "intra-VSM" traffic can include network traffic between VMs provisioned on separate physical servers hosting virtual switches or VEMs under the control of a common VSM, such as traffic between any VM 112 in network environment 100 of FIG. 1 or between VMs 412a and 412e, or 412a and 412c or 412d; VMs 412b and 412e, or 412b and 412c or 412d; and 412e and 412c or 412d in network environment 400 of FIG. 4. An "inter-domain" or "inter-VSM" communication, on the other hand, can include communications between VMs that are associated with VEMs controlled by separate VSMs. For example, a packet sent between a VM located in L2 network 224b to a VM located in L2 network 224c or L2 network 224d, or a VM located in L2 network 224c to a VM located in network 224d of FIG. 2 can be classified as an inter-domain or inter-VSM communication because distributed virtual switches 218a, 218b, and 218c are separately controlled by VSMs 202b, 202c, and 202d, respectively. Likewise, traffic between VMs 512a and 512b in network environment 500 of FIG. 5 can be classified as inter-domain or inter-VSM traffic since these VMs are within the domains of VSMs 502a and 502b, respectively.

In an example embodiment, packet inspection or mining can occur during the course of a VEM determining where to route a frame. For example, if a frame is received on ingress or via an uplink of the VEM, the frame is a VXLAN frame that will be de-encapsulated by the VEM to an Ethernet frame. Statistics can be collected from the Ethernet frame before the frame is sent to the destination VM, such as whether the frame is intra-server, intra-domain, or inter-domain traffic. If a frame is received on egress or via a downlink of the VEM, the frame is an Ethernet frame that may be encapsulated as a VXLAN frame. Encapsulation may include a lookup in a forwarding table, such as to determine a destination VEM/VTEP. In an example embodiment, the lookup may return a destination IP address, which can be utilized for incrementing various statistics, such as whether the frame can be characterized as local traffic (e.g., intended for another VM on the same physical server), east-bound traffic (e.g., to be sent to a virtual network appliance, such as a load balancer, firewall, or WAN accelerator, etc.), or north-bound traffic (to be sent to a physical switch). In another example embodiment, a first lookup may be performed to fetch a MAC address of a destination VEM/VTEP from a source VEM/VTEP's MAC address table, and a second lookup may be performed to fetch the IP destination address from a separate mapping or table of IP addresses of VMs of the network. In other example embodiments, other combinations of lookups can be performed based on various data models that can used and would be known to one of ordinary skill in the art.

Figure 6:
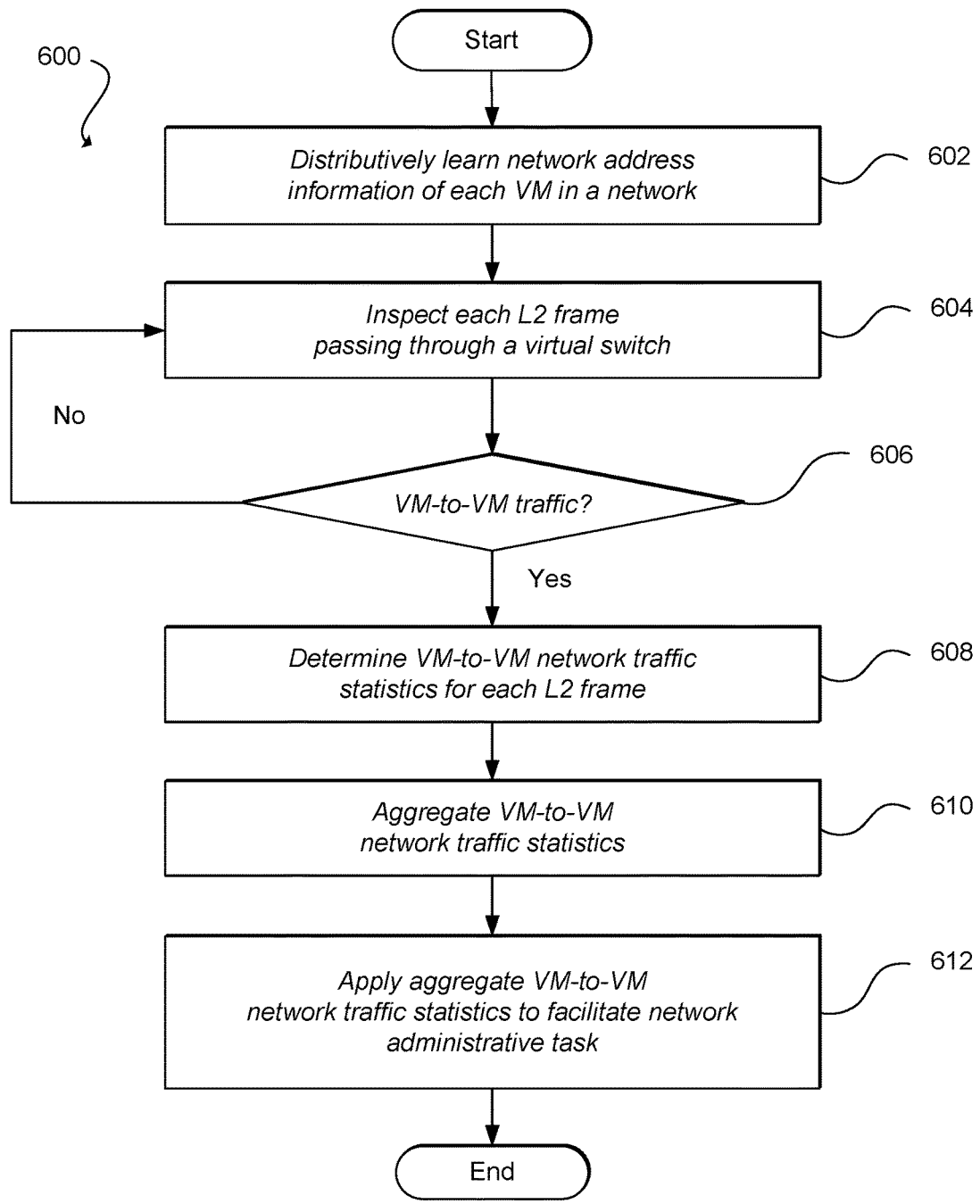
FIG. 6 illustrates an example process for collecting statistics relating to network traffic between virtual machines that can be utilized in an example embodiment.

FIG. 6 illustrates an example process 600 for collecting network traffic statistics between VMs in a network that can be utilized in an example embodiment. It should be understood that, for any process discussed herein, there can be additional, fewer, or alternative steps performed in similar or alternative orders, or in parallel, within the scope of the various example embodiments unless otherwise stated. Process 600 may begin with distributive learning of network address information of each VM (e.g., VM 112 of FIG. 1) in a network by each virtual switch (e.g., VEM/VTEP 114 of FIG. 1) of the network 602. For example, in a single-domain network (e.g., a network having one VSM, such as network 100 of FIG. 1 or network 400 of FIG. 4), the approach or a similar approach as discussed with respect to FIG. 4 can be utilized for network address learning. That is, when a VM is initially created and attached to a virtual switch, the virtual switch can learn the VM's L2 or MAC address and L3 or IP address. The virtual switch can propagate this address to its virtual switch controller (e.g., VSM 102 of FIG. 1). Alternatively, or in addition, a virtual switch can dynamically learn the IP addresses of other VMs based on the Address Resolution Protocol (ARP) or similar strategies known to those of ordinary skill. The virtual switch controller can store each VM's network information in the virtual switch controller's own mapping or table of VM IP addresses in its domain, and distribute this information to each VEM under the VSM's control. In an example embodiment, this distributive learning approach can be extended to a multiple domain network (e.g., a network having more than one active VSM, such as network 200 of FIG. 2 or network 500 of FIG. 5) using the technique or similar technique discussed in connection with FIG. 5. For instance, each VSM of a network can distribute its VM IP address table to each peer VSM, and each VSM can store and distribute the VM IP addresses of each of the VSM's peers to each of VEM in the VSM's domain. In this manner, every VSM and every VEM can learn the IP addresses of all VMs in the multi-domain network.

After a virtual switch learns the IP addresses of the VMs in the network, the virtual switch can begin inspecting each frame or packet passing through the switch 604. For example, the virtual switch can receive an Ethernet frame on the switch's downlink, i.e., from a VM attached to the switch. Thus, on egress, the virtual switch may already know the source MAC address and source IP address of the Ethernet frame corresponds to a VM without a lookup in the switch's VM IP address table. Instead, the virtual switch may obtain the network address information based on configuration of a virtual port (e.g., virtual port 116 of FIG. 1) that receives the frame. The virtual switch can also receive a VXLAN frame (encapsulating an original Ethernet frame), on the virtual switch's uplink, intended for an attached VM. In these situations, after de-encapsulation, the virtual switch may know that the destination MAC address and destination IP address corresponds to a VM without a lookup in the switch's VM IP address table. For instance, on ingress, the configuration of the virtual port for receiving the original Ethernet frame can indicate that the original Ethernet frame is destined for a VM.

Continuing with process 600, the virtual switch may analyze a frame to determine whether the frame can be classified as VM-to-VM traffic 606. In various example embodiments, the virtual switch may already know that one of the source (e.g., on egress) or the destination (e.g., on ingress) corresponds to a VM as discussed above. In these example embodiments, the virtual switch may perform one lookup to determine whether the originator (e.g., on ingress) or the terminator (e.g., on egress) also corresponds to a VM. In an example embodiment, if the lookup yields no result, it is assumed that the destination (e.g., on egress) or source (e.g., on ingress) is not associated with a VM, and no additional statistical analysis is performed and a next frame is inspected 605. In another example embodiment, a failed lookup can increment a counter, bucket, or other suitable data structure for tracking a ratio of VM-to-VM traffic to traffic not categorized as VM-to-VM traffic passing through the switch. In various example embodiments, the counter, bucket, or other suitable data structure can represent a number of packets, a data size, or both number of packets and data size. In an example embodiment, two lookups can be performed to determine whether both source and destination IP addresses in an IP header of an original Ethernet frame correspond to VMs.

If the frame can be characterized as VM-to-VM traffic, the virtual switch can determine various statistics 608 from inspection of the frame. In an example embodiment, the virtual switch may only monitor VM-to-VM traffic on egress. In another example embodiment, the virtual switch may only monitor VM-to-VM traffic on ingress. In various example embodiments, the virtual switch may monitor both ingress and egress VM-to-VM traffic, and the virtual switch can derive the ratio of ingress to egress VM-to-VM traffic therefrom.

In an example embodiment, a virtual switch can analyze each frame passing through the switch to determine whether the frame is intra-server, inter-server and intra-domain, and/or inter-domain. The virtual switch can track these categories by a number of frames of each type, a data size of each type, and/or one or more ratios of each type (e.g., by number of frames and/or data size). In an example embodiment, VM-to-VM traffic can be monitored at various granularities, including by specific virtual switch controller to any virtual switch controller, virtual switch, VM, and/or virtual port; by specific virtual switch to any VM and/or virtual port; by specific VM to any VM and/or virtual port; by a specific virtual port to any virtual port, as well as other levels of specificity as would be known to a person of ordinary skill in the art. As used herein, "any" network element may refer to every network element in a network, a set of network elements having a particular characteristic (e.g., any switch can refer to a set of switches in a certain domain, any VM can refer to a set of VMs attached to a certain switch, etc.), a set of network elements that can be designated by a user, or a specific network element. In other words, VM-to-VM network traffic statistics can be filtered according to any virtual switch controller, virtual switch, VM, and/or virtual port, among other levels of granularity. In an example embodiment, VM-to-VM network traffic statistics can also be filtered according to frame/packet size (e.g., below or above a specified threshold, undersize frame/packet, oversize frame/packet, jumbo frame/packet, etc.), frame/packet field (e.g., Ether Type, IP version, Type of Service (TOL), etc.), destination type (e.g., unicast, multicast, or broadcast), a time of creation of the frame/packet, a time received by the virtual switch, or a time the virtual switch sent the frame/packet, CRC alignment errors, as well as any other characteristic of a frame/packet or set of frames/packets that can be monitored as known in the art. It should be appreciated that there can be a tradeoff between the depth of the statistics collected versus processing, storage, and networking overhead for each virtual switch to gather extensively detailed traffic metrics. Nevertheless, VM-to-VM network traffic statistics can be collected in real-time or substantially real-time because of the relatively streamlined dataset collected (as compared to conventional approaches) and the distributive manner in which the network data is collected and processed (i.e., by one virtual switch per physical server in the network).

Process 600 can continue with each virtual switch sending the collected VM-to-VM network traffic statistics to the virtual switch controller 610. In an example embodiment, each virtual switch can send its network traffic statistics immediately after they have been collected and processed. In another example embodiment, a virtual switch can maintain a flow table and send a set of statistics for a flow after the flow is finished. In another example embodiment, each virtual switch within the domain of a virtual switch controller can stagger transmission of the switch's statistics to the controller. In another example embodiment, class-based queuing or similar strategies can be used by a virtual switch controller to determine the order statistics should be aggregated. For instance, certain applications in a data center may be more critical than others, and the statistics of VMs running such applications can be classified and/or weighted higher than other the statistics of other VMs.

After VM-to-VM network traffic statistics have been aggregated by the virtual switch controller, the statistics can be applied towards a network administrative task 612. In an example embodiment, statistics can be used to facilitate VM placement and migration. For example, if aggregate traffic statistics indicate that specific VM-to-VM traffic exceeds a certain threshold, the VMs can be migrated, automatically or manually, to a same physical server or to physical servers closer in proximity to one another. As another example, a data center may employ a hybrid cloud such that a VM placement and migration network policy can be set in place to minimize costs of resources provided by a public cloud provider based on the aggregate statistics. Alternatively, or in addition, aggregate statistics may indicate that private cloud resources are near capacity, and a network policy can be deployed to provision additional resources from a public cloud provider.

In an example embodiment, the aggregate statistics can be input into a dashboard or other graphical user interface (GUI) for a network administrator to monitor traffic patterns between virtualized systems (e.g., virtualized system 106 of FIG. 1) in real-time or substantially real-time. For instance, the dashboard or GUI can include a physical topology of a data center or network, and the aggregate statistics can be used to represent flows between hosts in the data center or network with various color schemes to indicate health of the flows, hosts, and/or networking gear. A flow/server/network element can be drilled into in order to view more detailed information derived from the aggregate statistics. In an example embodiment, historical baseline network traffic information can be presented with respect to real-time traffic statistics. The dashboard or GUI can be used by the network administrator for VM placement and migration, troubleshooting, capacity planning, among other administrative tasks.

Figure 7A:
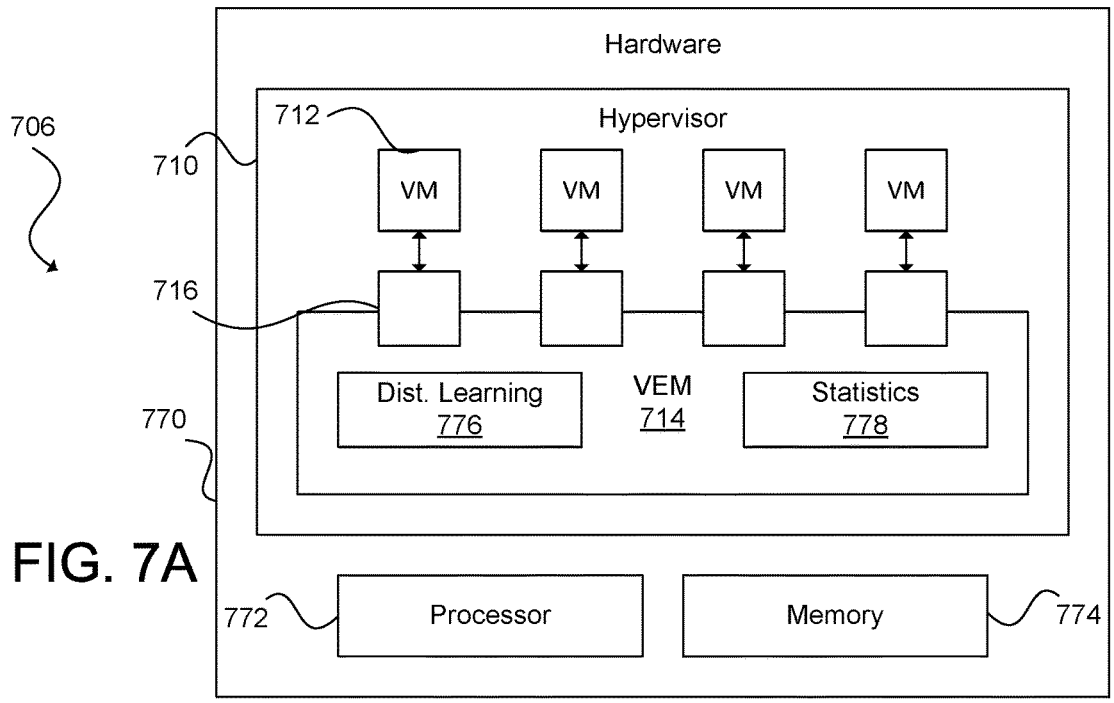
FIGS. 7A and 7B illustrate example systems that can be used in various example embodiments.

FIG. 7A illustrates an example embodiment of a virtualized system, such as virtualized system 106 of FIG. 1. Virtualized system 706 can include hardware 770, hypervisor 710, virtual machines 712, VEM 714, and virtual switch ports 716. Hardware 770 can represent any machine or apparatus that is capable of accepting, performing logic operations on, storing, or displaying data, and may include (without limitation) a processor 772 and an memory 774. In this example embodiment, VEM 714 can include virtual switch software comprising, for example, a distributive learning module 776 and a statistics module 778. Distributive learning module 776 can be used to learn IP addresses and/or other network address information of VMs in a network, and can include logic for performing the distributive learning techniques of FIGS. 4-6 or similar techniques. A table or mapping of VMs in a network to IP addresses and/or other network address information can be stored in memory 774. Statistics module 778 can be used for collecting network traffic statistics from packets passing through the VEM 714, and processing these statistics at the VEM. Statistics module 778 can include logic discussed with respect to FIG. 6.

Figure 7B:
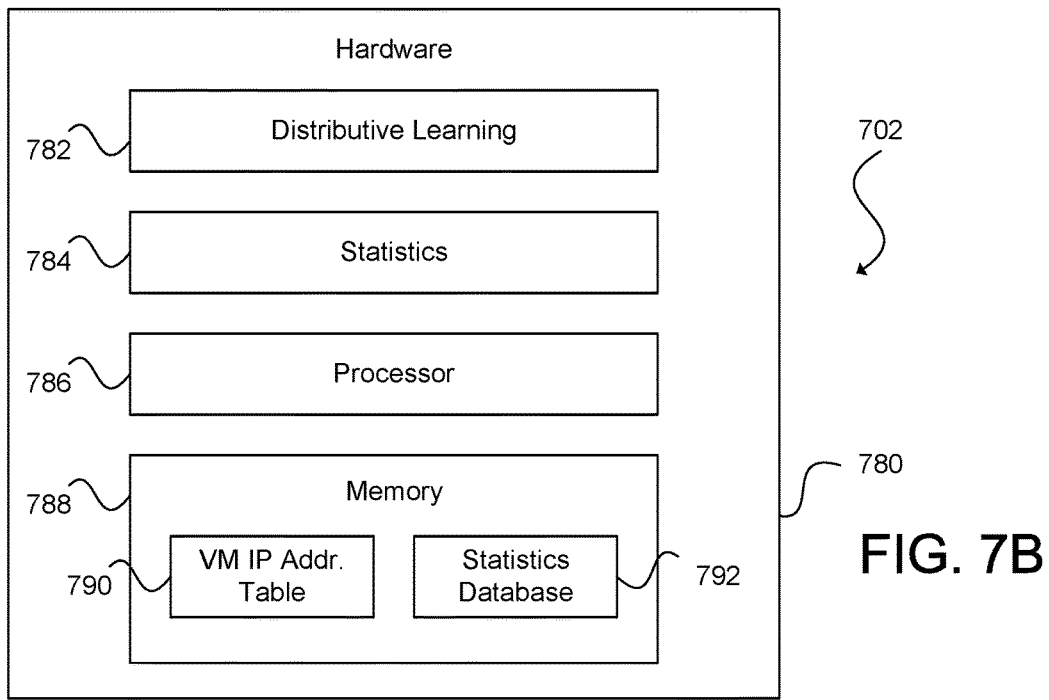

FIG. 7B illustrates an example embodiment of a VSM 702, such as VSM 102 in FIG. 1. VSM 702 can include hardware 780, and virtual switch controller software comprising, for example, a distributive learning module 782 and a statistics module 784. Distributive learning module 782 can be used to learn IP addresses and/or other network address information of VMs in a single domain network or a multiple domain network (e.g., MP-BPG EVPN). Distributive learning module 782 can include logic for implementing the distributive learning approaches discussed with respect to FIGS. 4-6 or similar approaches. In an example embodiment, some portions of distributive learning module 782 can be exposed as an API for customers to specify the types and volume of VM-to-VM traffic statistics to be collected by a network. Statistics module 784 can be used for aggregating network traffic statistics received from each VEM in the VSM's domain, and can include logic discussed with respect to FIG. 6. Hardware 780 can represent any machine or apparatus that is capable of accepting, performing logic operations on, storing, or displaying data, and may include without limitation a processor 786 and memory 788. Memory 788 can include, for example, a hash map, table, or other suitable data structure for storing the network address information of VMs within the VSM's domain 790. Memory 788 can also include a database or other suitable data structure for storing aggregate statistics received from virtual switches within the VSM's domain. Memory 788 can further include one or more tables, lists, or other data structures for storing data associated with certain operations described herein.

In an example embodiment, VSM 702, virtualized system 706, VEM 714, and/or physical switches connected thereto (not shown) can be network elements, which can encompass network appliances, servers, routers, switches, firewalls gateways, bridges, load balancers, modules, or any other suitable device, proprietary component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with the above network elements, each of VSM 702, virtualized system 706, VEM 714, and/or a physical switch (not shown) connected to these components can include memory elements for storing information to be used in the operations disclosed herein. Additionally, virtualized system 706 may also include virtual memory elements for storing information associated with virtual partitions, such as virtual machine 712. Each of VSM 702, virtualized system 706, VEM 714, and/or a connected physical switch may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory elements discussed herein (e.g., memory 774 and 788) should be construed as being encompassed within the broad term "memory element" or "memory." Information being used, tracked, sent, or received by each of VSM 702, virtualized system 706, VEM 714, and/or a connected physical switch can be provided in any database, register, queue, table, cache, control list, or other storage structure, all of which can be referenced at any suitable timeframe. Any such storage options may be included within the broad term "memory element" or "memory" as used herein.

In an example embodiment, each of VSM 702, virtualized system 706, VEM 714, and/or a connected physical switch may include software modules (e.g., distributive learning or statistics) to achieve, or to foster operations as outlined herein. In other example embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

For clarity of explanation, in some instances the present technology may be presented as including individual functional blocks including functional blocks comprising devices, device components, steps or routines in a method embodied in software, or combinations of hardware and software.

Note that in certain example implementations, the distributive learning and statistics collection modules discussed herein may be implemented by logic encoded in one or more tangible, non-transitory media (e.g., embedded logic provided in an application specific integrated circuit (ASIC), digital signal processor (DSP) instructions, software (potentially inclusive of object code and source code) to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   analyzing a frame received by a virtual switch to determine one or more statistics relating to network traffic between a first virtual machine (VM) and a second VM, the virtual switch controlled by a virtual switch controller and deployed on a first physical server, the analyzing of the frame includes determining whether the frame is intra-server, inter-server, and/or inter-domain;
   performing a lookup in a forwarding table of the virtual switch to determine a virtual tunnel network address and a virtual network identifier;
   encapsulating the frame with a virtual network overlay encapsulation based on the virtual tunnel network address and the virtual network identifier to yield an encapsulated frame;
   sending the encapsulated frame from the virtual switch to a physical switch;
   sending the one or more statistics to the virtual switch controller; and
   determining whether to migrate a VM from the first physical server to a second physical server based at least in part on the one or more statistics.

2. The method of claim 1, further comprising:
   receiving, by the virtual switch, the frame including an original network protocol header that includes a network address;
   performing another lookup in a network address table of the virtual switch to determine that the network address corresponds to the second VM;
   sending, from the virtual switch to the virtual switch controller, a respective network address of each VM deployed on a physical server;
   receiving, by the virtual switch from the virtual switch controller, a plurality of network addresses that each correspond to one of a plurality of VMs, the plurality of VMs each deployed on one of a plurality of physical servers that each host one of a plurality of virtual switches controlled by the virtual switch controller; and
   updating the network address table of the virtual switch with each of the plurality of network addresses included in a list of network addresses.

3. The method of claim 2, further comprising:
   sending, from a first virtual switch controller to a second virtual switch controller, the list of network addresses;
   receiving, by the first virtual switch controller from the second virtual switch controller, another plurality of network addresses that each correspond to one of another plurality of VMs, the another plurality of VMs each deployed on one of another plurality of physical servers that each host one of another plurality of virtual switches controlled by the second virtual switch controller; and
   sending, from the first virtual switch controller to each of the plurality of virtual switches controlled by the first virtual switch controller, the another plurality of network addresses.

4. The method of claim 3, further comprising:
   receiving, at the virtual switch from the first virtual switch controller, the another plurality of network addresses; and
   updating the network address table of the virtual switch with each of the another plurality of network addresses.

5. The method of claim 3, wherein sending the plurality of network addresses and receiving the another plurality of network addresses is performed based at least in part on Border Gateway Protocol (BGP).

6. The method of claim 1,
   wherein,
   the frame includes a network protocol header that includes a network address,
   the frame is an Ethernet frame,
   the network protocol header is an Internet Protocol (IP) header, and
   the network address is an IP address.

7. The method of claim 1, further comprising:
determining that the frame corresponds to one of intra-server, inter-server and intra-domain, or inter-domain VM-to-VM network traffic.

8. The method of claim 1, further comprising:
tracking the frame based on whether the frame is determined to be intra-server, inter-server, and/or inter-domain to yield a number of frames of each type; and
filtering the one or more statistics based on at least one of one or more virtual switch controllers, one or more virtual switches, one or more VMs, or one or more virtual ports.

9. The method of claim 1,
wherein,
the frame is received to a downlink of the virtual switch,
the lookup is performed using a first Layer 2 (L2) destination address included in the frame,
the virtual tunnel network address and the virtual network identifier correspond to the first L2 destination address, and
the virtual network overlay encapsulation includes a second L2 destination address of a next hop for the frame, an L2 source address of the virtual switch, the virtual tunnel network address, a source network address of the virtual switch, and the virtual network identifier to generate an encapsulated frame.

10. The method of claim 1, wherein the frame is received by an uplink of the virtual switch, and the method further comprises:
de-encapsulating the virtual network overlay encapsulation from the frame at the virtual switch to generate a de-encapsulated frame.

11. The method of claim 10, further comprising:
sending the de-encapsulated frame from the virtual switch to the first VM.

12. The method of claim 1, further comprising:
displaying a topology of a data center including the first physical server, the second physical server on which the second VM is deployed, and one or more physical switches to which the first physical server and the second physical server are connected; and
displaying a representation of the network traffic between the first VM and the second VM based at least in part on the one or more statistics.

13. A non-transitory computer-readable storage medium having stored therein instructions that, upon being executed by a processor, cause the processor to:
receive, by a virtual switch controller of a network, a plurality of Internet Protocol (IP) addresses each corresponding to one of a plurality of virtual machines (VMs) of the network, each of the plurality of VMs corresponding to one of a plurality of virtual switches controlled by the virtual switch controller;
receive, at the virtual switch controller, one or more statistics relating to network traffic between a first VM of the plurality of VMs and a second VM of the plurality of VMs;
perform a lookup to determine a virtual tunnel network address and a virtual network identifier;
encapsulate a frame with a virtual network overlay encapsulation based on the virtual tunnel network address and the virtual network identifier to yield an encapsulated frame;
send the encapsulated frame to a physical switch;
determine whether to migrate a VM to a first physical server or a second physical server based at least in part on the one or more statistic; and
migrate the VM to the first physical server or the second physical server.

14. The non-transitory computer-readable storage medium of claim 13, wherein the instructions upon being executed further cause the processor to:
send, from the virtual switch controller, the plurality of IP addresses to a second virtual switch controller;
receive, by the virtual switch controller from the second virtual switch controller, another plurality of IP addresses that each correspond to one of another plurality of VMs, each of the another plurality of VMs corresponding to one of another plurality of virtual switches controlled by the second virtual switch controller;
update, by the virtual switch controller, a VM IP address table with the another plurality of IP addresses; and
send, from the virtual switch controller, the another plurality of IP addresses to the plurality of virtual switches.

15. The non-transitory computer-readable storage medium of claim 14, wherein the virtual switch controller and the plurality of virtual switches communicate via a packet interface of the virtual switch controller, and the virtual switch controller and the second virtual switch controller communicate via Border Gateway Protocol (BGP).

16. The non-transitory computer-readable storage medium of claim 13, wherein the one or more statistics correspond to one of local, east-bound, or north-bound VM-to-VM network traffic.

17. A system comprising:
a processor; and
a memory including instructions that, upon being executed by the processor, cause the system to:
send, from a virtual switch deployed on the system to a virtual switch controller, a first IP address of a first virtual machine (VM) deployed on the system;
receive, by the virtual switch from the virtual switch controller, a second IP address of a second VM;
perform a lookup in a forwarding table of the virtual switch to determine a Virtual Tunnel Endpoint (VTEP) IP address and a virtual network segment identifier (VNID);
encapsulate an Ethernet frame with a virtual network overlay encapsulation based on the VTEP IP address and the VNID to yield an encapsulated Ethernet frame;
send the encapsulated Ethernet frame from the virtual switch to a physical switch;
determine, by the virtual switch, a statistic relating to network traffic between the first VM and the second VM;
send, from the virtual switch to the virtual switch controller, the statistic;
determine whether to migrate the second VM to a first physical server or a second physical server based at least in part on the statistic; and
migrate the VM to the first physical server or the second physical server.

18. The system of claim 17,
wherein,
the Ethernet frame is received to a downlink of the virtual switch,
the lookup is performed using an inner Media Access Control (MAC) destination address included in the Ethernet frame, the VTEP IP address and the VNID correspond to the inner MAC destination address, and the encapsulation is performed using a first MAC address of a next hop for the Ethernet frame as an outer MAC destination address, a second MAC address of the virtual switch as an outer MAC source address, the VTEP IP address as an outer IP destination address, an IP address of the virtual switch as an outer IP source address, and the VNID for a VXLAN header to generate a VXLAN frame.

19. The system of claim 17, wherein the Ethernet frame is a VXLAN frame, the Ethernet frame is received to a downlink of the virtual switch, and the instructions upon being executed further cause the system to:

de-encapsulate the VXLAN frame to generate an original Ethernet frame; and send the original Ethernet frame from the virtual switch to the first VM.

20. The system of claim 17, wherein the instructions upon being executed further cause the system to:

display a topology including a first representation of the first VM and a second representation of the second VM, and a third representation of the network traffic between the first VM and the second VM based at least in part on the statistic.

\* \* \* \* \*